Figure 1:
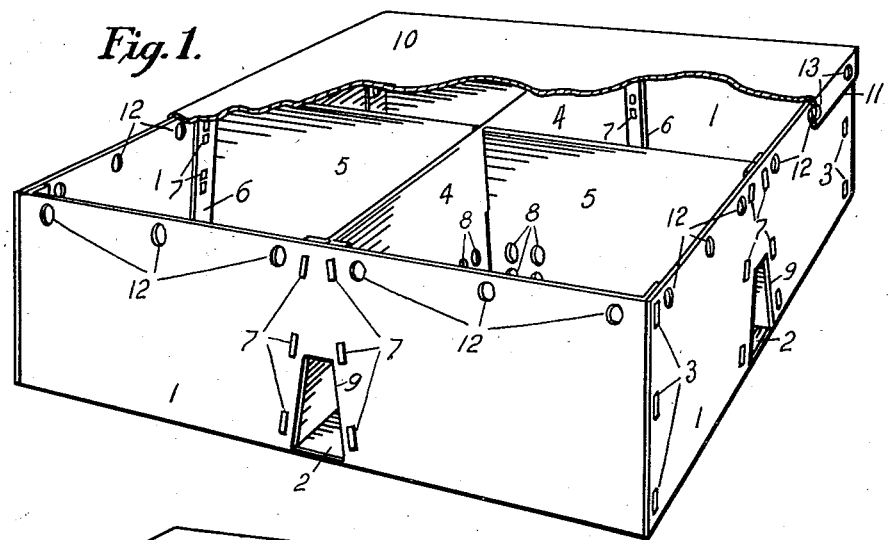

March 5, 1935.  C. T. PATTERSON  1,993,112

CHICK BOX

Filed May 24, 1934

Charley T. Patterson
INVENTOR.

H. W. Young
WITNESS.

Patented Mar. 5, 1935

1,993,112

UNITED STATES PATENT OFFICE 1,993,112

CHICK BOX

Charley T. Patterson, Springfield, Mo.

Application May 24, 1934, Serial No. 727,255

1 Claim. (Cl. 119—19)

My invention relates to a chick box having a central circulation ventilation system and designed to overcome the objections attending chick boxes of the ordinary or diffusion type.

Considerable difficulty has been experienced in the use of chick boxes on account of improper ventilation and unequalized temperature. Proper ventilation is not afforded the inner corners of the compartments in the ordinary chick box having partitions which divide the box into compartments inasmuch as fresh air can not reach these parts except by diffusion and the design of these boxes is such that diffusion is very incomplete in the inner corners of the compartments inasmuch as the air is drawn in at the sides of the box and passed out at the top.

It is a well known fact that the central portion of a box of chicks is inclined to attain a much higher temperature than portions near the outer walls due to the generation of animal heat by the chicks and in the ordinary chick box this condition is augmented by the lack of ventilation in the central portion. In case the ordinary box of chicks is subjected to a temperature low enough to cause the chicks to crowd together into the inner corners of the compartments to seek warmth it is apparent that suffocation is likely to result inasmuch as crowding together would tend to cause this result and this unfavorable condition is aggravated by the fact that the chicks have crowded into the part of the box that has the least ventilation.

In my invention I have endeavored to overcome this unbalanced condition relative to heat and ventilation. I have provided a chick box that supplies ventilation to the parts of the box that need it most; i. e. the central portion. In my invention the intake vents open into the compartments in the central portion of the box or near the inner corners of the compartments and near the bottom and as the air is heated by the chicks it is drawn outwardly and expelled through outlets in the outer walls near the top thereby supplying fresh air to all parts of the box by convection.

It will be seen that this system supplies fresh, cool air to the part of the box that is inclined to become the hottest; i. e. the central part and as it warms it travels toward the parts of the box that are inclined to be the coldest; i. e. the outer walls thereby tending to balance the temperature throughout the box. This balanced temperature minimizes the tendency of the chicks to crowd into the inner corners when subjected to unduly low temperatures and any danger of suffocation from this cause is eliminated through the provision of ample ventilation at these points.

A further advantage of my invention lies in the fact that no ventilation is necessary through the top of the box which allows the boxes to be stacked on top of each other without the use of ventilator strips or separators between the stacked boxes as is the case with the ordinary box.

Another advantage of my invention is that in case any of the intake vents should accidentally become obstructed air is supplied to all compartments by the remaining vents inasmuch as the ventilation conduits are intercommunicating.

Figure 2:
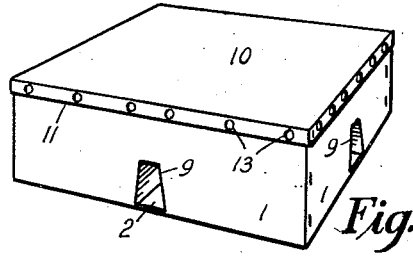
Figure 6:
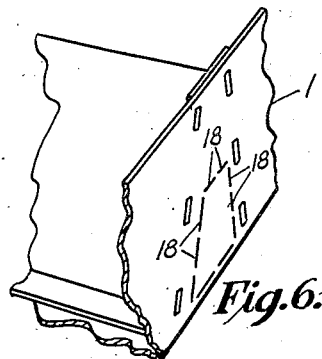
Figure 3:
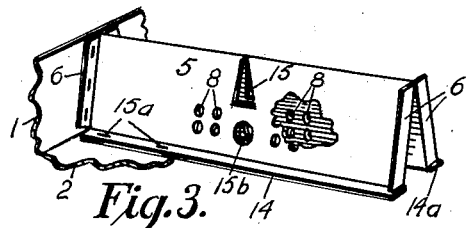
Figure 5:
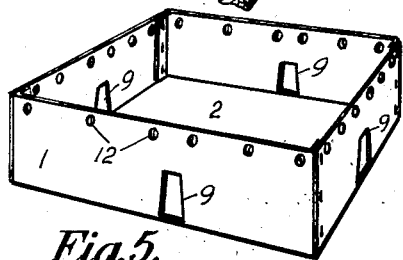
Figure 4:
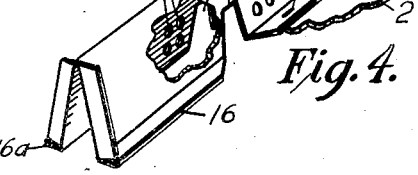

Other objects and advantages of this invention will be pointed out in the detailed description appearing hereinafter, and in order that the invention may be better understood, reference is had to the accompanying drawing in which:

Fig. 1 is a perspective view partly in section (fragmentary) showing one embodiment of my invention. Fig. 2 shows a perspective view of the box with the cover in place. Figs. 3 and 4 show the combination partitions and conduits. Fig. 5 is a perspective view showing the box with the cover and partitions removed and Fig. 6 is a fragmentary view showing a method of forming the intake openings. In Fig. 1 the numeral 1 designates the sides of the box which are in unitary relation with the bottom 2 and secured at the corners by staples 3, 3. 4 and 5 represent combination partitions and ventilation conduits which are of inverted V shape in cross section (vertical) and have flanges at 6, 6 which are secured to the sidewalls by staples 7, 7. Openings are provided in 4 and 5 at 8, 8 and similar openings are provided in like position in each of the other walls of 4 and 5. Openings 9, 9 are provided in the side walls interconnecting with the conduits 4 and 5 and similar openings are provided in the opposite sidewalls of the box, these openings serving as intake vents whereby air may be drawn into the conduits 4 and 5 and passed into the compartments of the box at 8, 8. 10 represents a fragmentary section of the box cover having side walls 11. 12, 12, 12, etc. are openings in the sidewalls 1, 1 which serve as outlets through which air may pass from the compartments of the box to the atmosphere. Openings 13, 13 in the sidewalls of the cover interconnect with openings 12, 12 in 1, 1.

Fig. 3 shows the combination partition and conduit 5 in which the parts are designated with the same numerals as in Fig. 1. This view also shows a flange 14 formed on the bottom of 5 which is attached to 2 by staples 15a. 14a shows a similar flange on the opposite side of 5, which is also attached to the bottom 2. 15 is a triangular aperture formed in the top of 5 into which the central portion of 4 may be inserted in crossed relation to 5. 15b is an opening which interconnects the conduits 4 and 5. In this view a portion of one of the walls of 5 is removed to show the openings 8, 8 in the opposite wall.

Fig. 4 shows the combination partition and conduit 4 and shows, in addition, flanges 16 and 16a formed on the bottom of 5. These flanges are secured to 2 by staples 17a. 17 is an opening into which the central part of 5 may be inserted in crossed relation.

In Fig. 6, 18, 18, 18, etc. indicate interstices in the wall 1 outlining the desired openings shown in the other figures of the drawing. Until such a time as desired the portion of the sidewall inside the interstices may be left intact, held in place by the portions of the sidewall between the interstices. By this method openings of any desired size may be torn in the area outlined by the interstices thereby regulating the amount of ventilation supplied the box.

I claim:—

A chick box having partitions dividing the said box into sections, said partitions comprising conduits, said conduits interconnecting with openings in the sidewalls of said box whereby air may enter said conduits, said conduits having openings near the center of said box through which air may pass from said conduits into the sections of said box, the side walls of said box having openings near the tops thereof through which air may pass from said sections.

CHARLEY T. PATTERSON.